US011130088B2

(12) United States Patent
Loehl et al.

(10) Patent No.: US 11,130,088 B2
(45) Date of Patent: Sep. 28, 2021

(54) MULTI-MODAL MULTI-MEDIA AIR FILTRATION SYSTEM

(71) Applicant: MANN+HUMMEL GmbH, Ludwigsburg (DE)

(72) Inventors: Thomas Loehl, Mundelsheim (DE); Anja Koronai-Bauer, Constance (DE); Rodrigo Reyes, Belmont, NC (US); Martin Lehmann, Karlsruhe (DE); Tina Davis, Youngsville, NC (US); Matthew Currin, Raleigh, NC (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 198 days.

(21) Appl. No.: 16/135,544

(22) Filed: Sep. 19, 2018

(65) Prior Publication Data

US 2019/0282944 A1  Sep. 19, 2019

Related U.S. Application Data

(60) Provisional application No. 62/642,398, filed on Mar. 13, 2018.

(51) Int. Cl.
*B01D 46/00* (2006.01)
*B01D 46/24* (2006.01)
*B01D 46/46* (2006.01)
*B01D 46/44* (2006.01)

(52) U.S. Cl.
CPC ....... *B01D 46/0087* (2013.01); *B01D 46/002* (2013.01); *B01D 46/2403* (2013.01); *B01D 46/2411* (2013.01); *B01D 46/46* (2013.01); *B01D 46/442* (2013.01); *B01D 46/446* (2013.01); *B01D 2273/10* (2013.01); *B01D 2273/16* (2013.01); *B01D 2275/201* (2013.01); *B01D 2279/60* (2013.01)

(58) Field of Classification Search
CPC ............ B01D 2273/10; B01D 2273/16; B01D 2275/201; B01D 2279/60; B01D 46/002; B01D 46/0087; B01D 46/2403; B01D 46/2411; B01D 46/442; B01D 46/446; B01D 46/46
See application file for complete search history.

(56) References Cited

U.S. PATENT DOCUMENTS

2011/0001003 A1* 1/2011 Krahl .................... B64D 33/02
244/58

\* cited by examiner

*Primary Examiner* — Sharon Pregler

(57) ABSTRACT

A multi-modal multi-media air filtration system which can include: a base having one or more connection features and a filter media assembly, the filter media assembly being configured to attach to the base portion at a first end. The filter media assembly can then also include a first filter media extending across a first air flow path and a second filter media extending across a second air flow path. The air filtration assembly can then also include an actuation assembly configured to selectively open or close one of the first air flow path or the second air flow path so as to alternate the degree of filtration passing through the filter media assembly based on the degree of filtration provided by the first or second filter media.

12 Claims, 16 Drawing Sheets

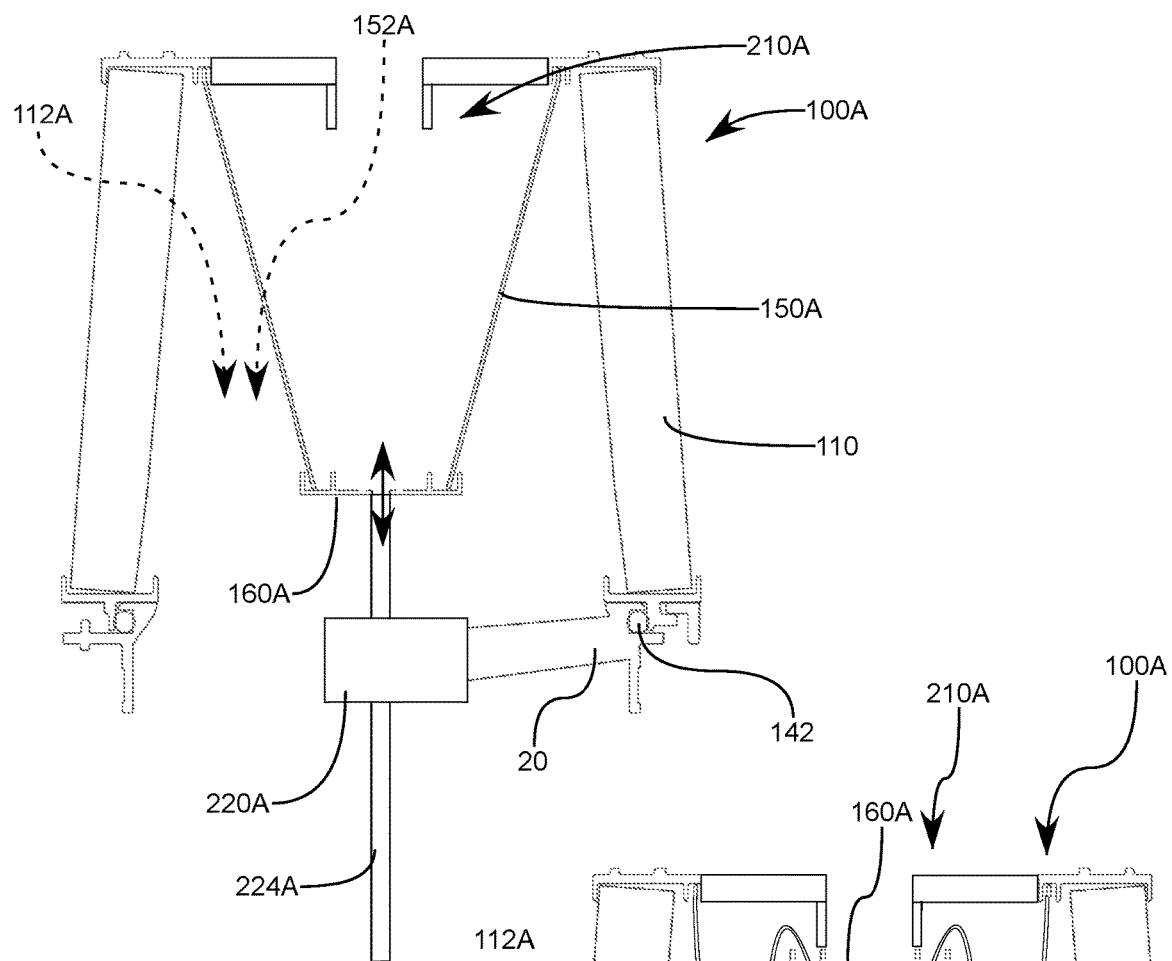
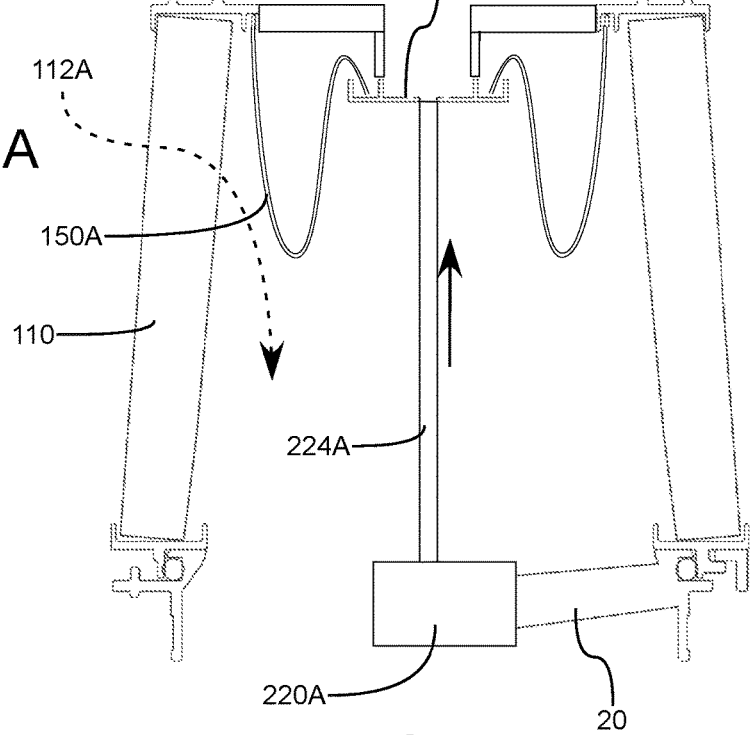
FIG. 11A
FIG. 11B

MULTI-MODAL MULTI-MEDIA AIR FILTRATION SYSTEM

CROSS-REFERENCE TO RELATED APPLICATION

This his application claims the benefit of U.S. Provisional Application No. 62/642,398, filed Mar. 13, 2018.

FIELD OF THE INVENTION

The present disclosure generally relates to the field of air filtration, and more particularly to air filtration systems within vehicles and machinery.

BACKGROUND OF THE INVENTION

When using large motorized machinery, vehicles, etc. and particularly in the field of vehicles which operate in a wide variety of environmental and performance conditions, varying degrees of air filtration as well as air flow rates can be desired, or necessary, for a particular application. It is well understood that these machines operate in an optimal fashion when the filter elements are regularly replaced or cleaned. Changing or cleaning the filter element prematurely or using certain performance-based filters can lead to damage over time. However, using a specific filter based on a particular application can provide desired output for short term applications. Additionally, various filter media can be selected and provided about the air intake of the vehicle or equipment based on airflow or cleaning requirements. These filter media have typically been a single filter element with a common media throughout which can only be changed through a complete removal of an existing filter element and replacement with a new filter element having the desired media having desired filtration and flow properties.

Changing a filter element can be time consuming and can provide various situations which can cause damage to filter elements. Further, fine filter elements can cause inefficiency in the motor, while high-pass-through elements can often allow harmful particulates to enter the machinery, such as into the combustion chamber, and cause premature wear and failing. However, in engines or machinery which operates in a wide range of conditions or performance situations, typically, a single filter element is selected for the air intake despite the existence of a wide spectrum of filtration needs.

SUMMARY OF THE INVENTION

It has been recognized that many different engines and machinery could benefit from an air filtration system which has various filtration media provided therein which can operate in a plurality of modes which can change an air intake flow path through a desired media based on various performance or environmental conditions. The modes can be selected manually by the user, or the modes can be changed automatically in response to sensed environmental conditions or operational states.

As such, a multi-modal multi-media air filtration system is contemplated herein which can include a base having one or more connection features; a filter media assembly, the filter media assembly being configured to attach to the base portion at a first end, the filter media assembly having a first filter media extending across a first air flow path, the first air flow path extending through a radial sidewall of the filter media assembly; and a second filter media extending across a second air flow path, the second air flow path extending through a second end of the filter media assembly. The multi-modal multi-media air filtration system can then include an actuation assembly which can be configured to selectively open or close one of the first air flow path or the second air flow path.

In some embodiments, the filter media assembly can further include one or more flow path apertures provided about the second end.

In yet additional embodiments, the actuation assembly can also include a movable blocking mechanism being configured to selectively open or close the one or more flow path apertures. In some such embodiments the blocking mechanism can be provided as a rotatable disc provided with one or more corresponding apertures wherein rotation of the rotatable disc selectively opens or closes the one or more flow path apertures. In some alternative embodiments, the blocking mechanism can instead be configured to translate axially so as to open or close the one or more flow path apertures. In some such embodiments, the movable blocking mechanism can be provided about an exterior end surface of the second end of the second filter media.

In some additional embodiments the first filter media can define an internal cavity, wherein the second filter media can be provided within the internal cavity. In some such embodiments, the second filter media can be provided having a generally conical shape.

In various embodiments, the multi-modal multi-media air filtration system can be operable in a first mode defined by a state wherein air is received from an ambient area and into an interior portion of the filter media assembly through only the first filter media, and wherein the multi-modal multi-media air filtration system is operable in a second mode wherein air is received through both the first filter media and through the second filter media.

In some embodiments the second filter media has a lower air flow resistance than the first filter media, or alternatively the first filter media can have a lower air flow resistance than the second filter media.

Also contemplated herein are various methods of providing air filtration utilizing one or more of the devices discussed above, wherein the method can include the steps of: providing a base having one or more connection features; affixing a filter media assembly to the base; the filter media assembly including: a first filter media extending across a first air flow path, the first air flow path extending through a radial sidewall of the filter media assembly; and a second filter media extending across a second air flow path, the second air flow path extending through a second end of the filter media assembly; providing an actuation assembly about the base, the actuation assembly being configured to selectively open or close one of the first air flow path or the second air flow path by moving a movable blocking mechanism thus selectively opening or closing the first flow path or the second flow path; and opening and closing the first air flow path or the second air flow path.

This method can also include various alternative steps, which can include: receiving air from an ambient area into an interior portion of the filter media assembly through only the first filter media thus defining a first mode; and alternating to a second mode, the second mode being defined by receiving air through both the first filter media and through the second filter media.

Additionally, the method can include a step of receiving a user input to alternate between the first operation mode and the second operation mode or receiving an automatically generated command to alternate between the first operation mode and the second operation mode, the automatically generated command being based on one or more sensed parameters.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein:

FIGS. 11A-B illustrate side views of an alternative embodiment of a multi-modal multi-media air filtration system utilizing an alternative actuation assembly;

DETAILED DESCRIPTION OF THE INVENTION

Figure 1:
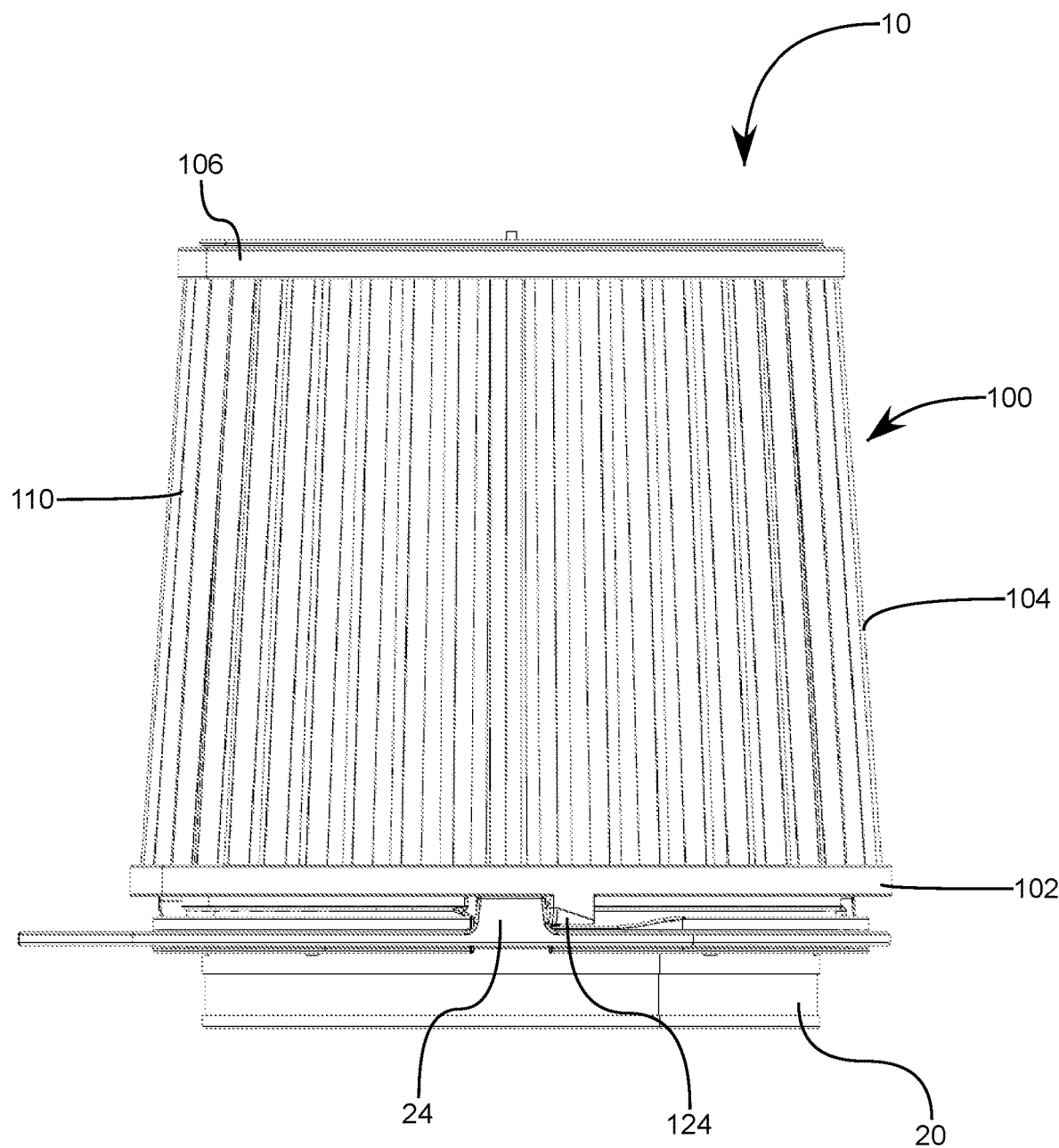
FIG. 1 illustrates a side view of a multi-modal multi-media air filtration system illustrative of various embodiments of the present invention.
Figure 2:
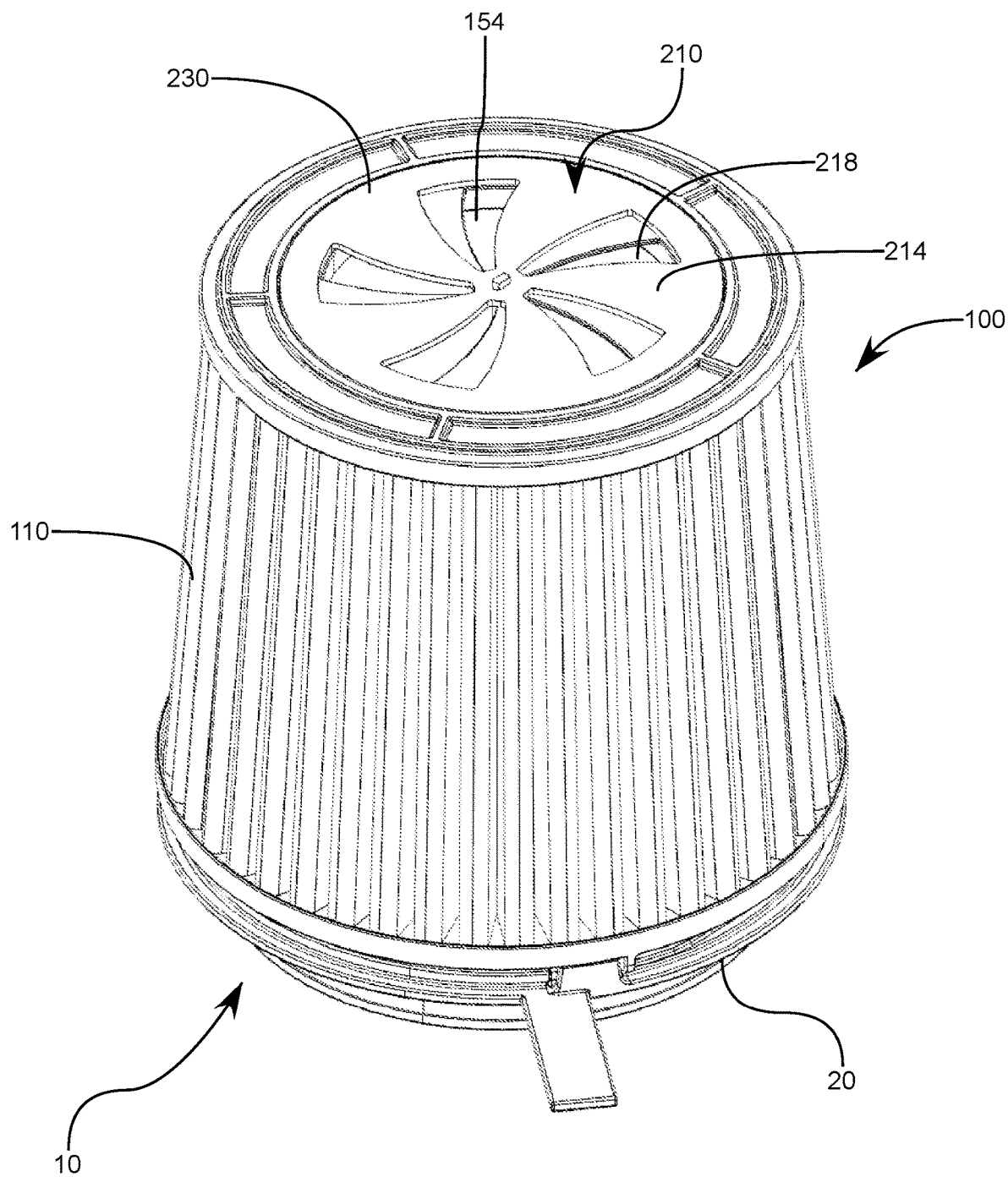
FIG. 2 illustrates a top perspective view of the multi-modal multi-media air filtration system of FIG. 1.
Figure 3:
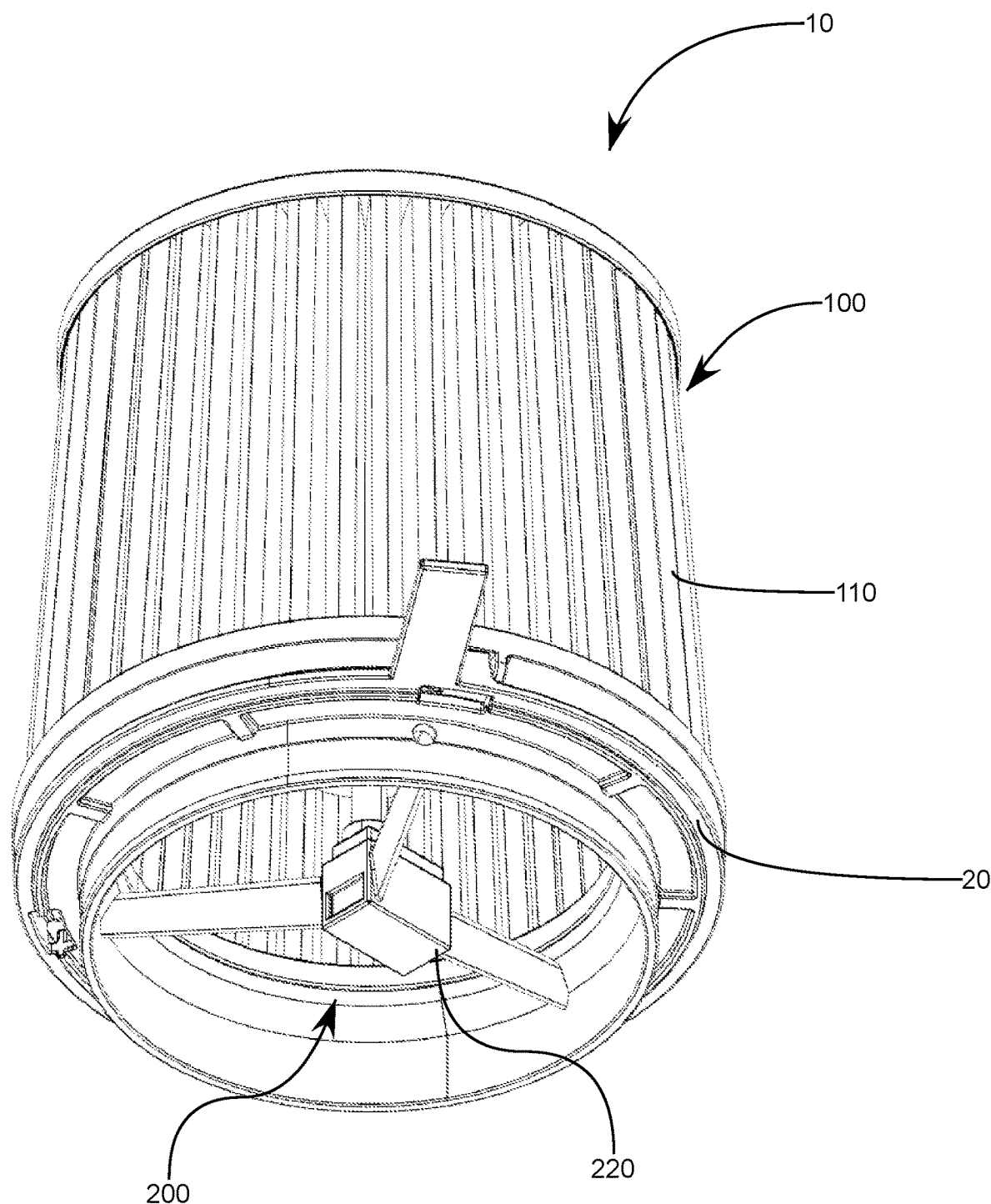
FIG. 3 illustrates a bottom perspective view of the multi-modal multi-media air filtration system of FIG. 1.

It will be appreciated by those having skill in the area of air filtration, and particularly in the field of engine air filtration that various operation modes and environments can often require widely varying filtration needs and airflow requirements which can thus require corresponding variations in filter media specifications.

By way of example, an individual may operate a high-performance car in daily driving in environments which might have a moderate number of particulates such as along highways or residential roads which does not require high airflow. However, this car could also be utilized recreationally in race situations, which may be on closed driving tracks, in which an increased airflow is desired for higher performance wherein the reduced particulate filtration is tolerated in lieu of the increased airflow, but only for reduced time periods. In this scenario, the individual could accept the lower particulate removal in a controlled environment or for short time periods for racing purposes, but not be willing to reduce particulate removal for typical everyday driving.

An alternative example can be described as thus: in some environments, such as for harvesting equipment, the particulate count in the ambient air can vary greatly based on soil moisture, crop type, etc., and the same harvester can be used for various crops, and soil moisture and thus dust, can vary greatly based on recent rain, weather, or location. As such, increased filtration can be required for some crop types and less for others, or more on dry days, and less on wet days.

Previously, an operator or owner has been required to select a single filter having a single filter media which provides filtration for all operation modes, in all environments. Further, the air filtration media can often be burdensome to change or replace, such that operators either choose an overly robust filter media and sacrifice performance or efficiency by selecting filter media with high resistance but good filtration, or they choose low filtration with low resistance and potentially sacrifice engine longevity because it is too burdensome or inconvenient to change the filter having an optimized filter media for a particular performance standard or one a given environmental particulate level, etc.

As such, one aspect of the present invention is to provide a multi-modal multi-media air filtration system which includes a plurality of varying filter media which allows a user or system to easily switch between operation modes in which one of the filter media is utilized based on a desired performance mode or environmental factor. The multi-modal multi-media air filtration system can thus include a plurality of filter media across a corresponding plurality of air flow paths wherein an active air flow path across a desired media can be provided by opening the desired path through the desired filter media, or close undesired air flow paths across undesired filter media.

FIGS. 1-10 illustrate an exemplary embodiment of a multi-modal multi-media air filtration system 10. The multi-modal multi-media air filtration system 10 can include a filter media assembly 100 which can be configured to attach to a base 20, the base effectively operating as a connection interface to an air intake for a piece of equipment, not shown. One such example of equipment being a car as discussed above. The base 20 can include one or more connection features 24, which are illustrated in herein as a bayonet or a twisting lock, but these features can also be replaced with alternative features which might include threads lock rings, snap rings, or any other connection mechanism as will be recognized by those being skilled in the art as any connection feature capable of affixing a filter assembly to an air intake. In this manner the air intake of the equipment can be provided with a filter media assembly in accordance with various aspects of the present invention so as to allow switching between various flow paths through various filter media having distinguishing filtration properties.

The filter media assembly 100, as illustrated herein can include corresponding connection features 124, such as flanges, threads, or otherwise, so as to facilitate attachment of the filter media assembly 100 to the base portion 20. Preferably these corresponding connection features can be provided about a first or bottom end 102 of the filter media assembly 100.

Figure 4:
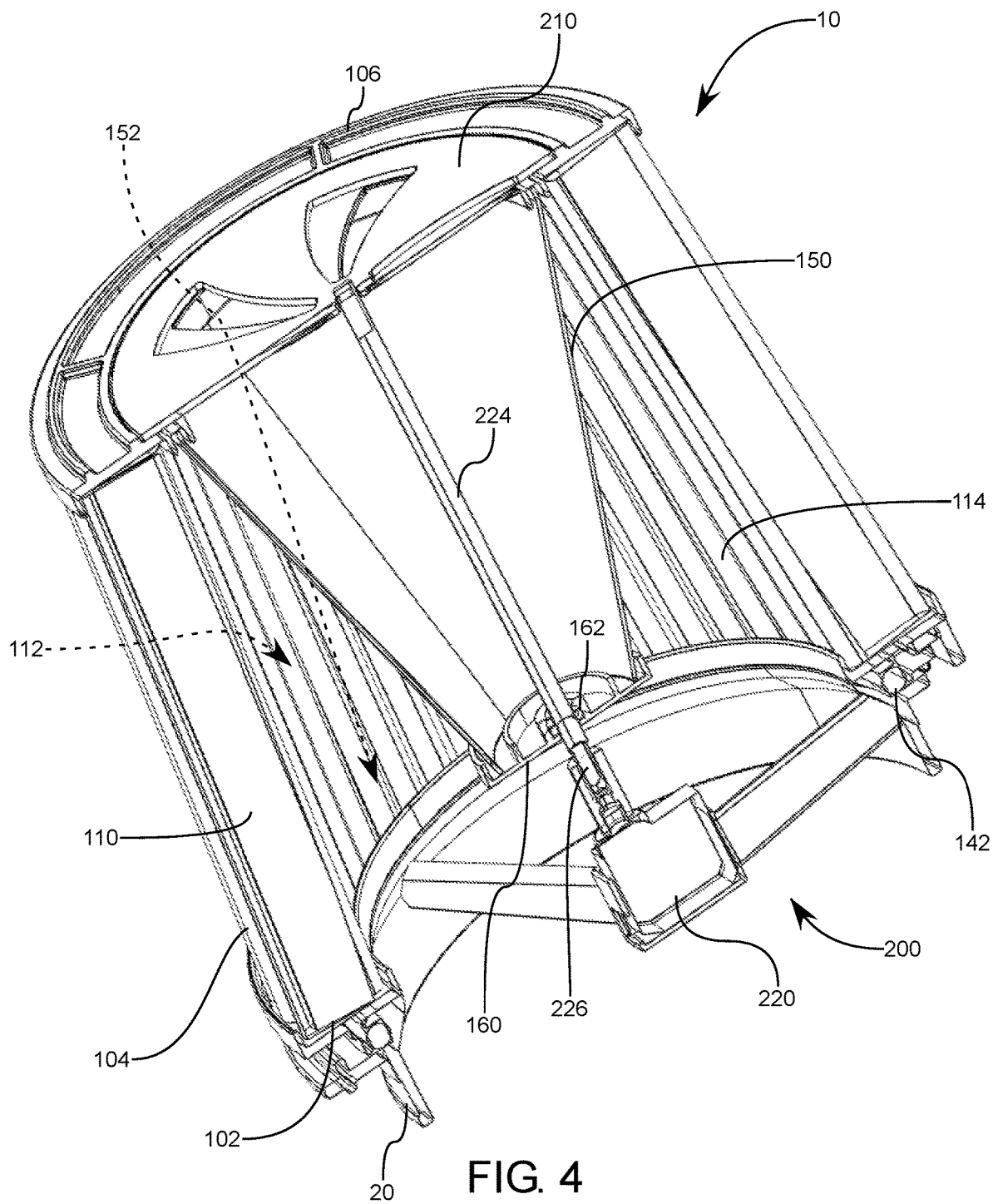
FIG. 4 illustrates a side perspective cross-sectional view of the multi-modal multi-media air filtration system of FIG. 1.
Figure 5:
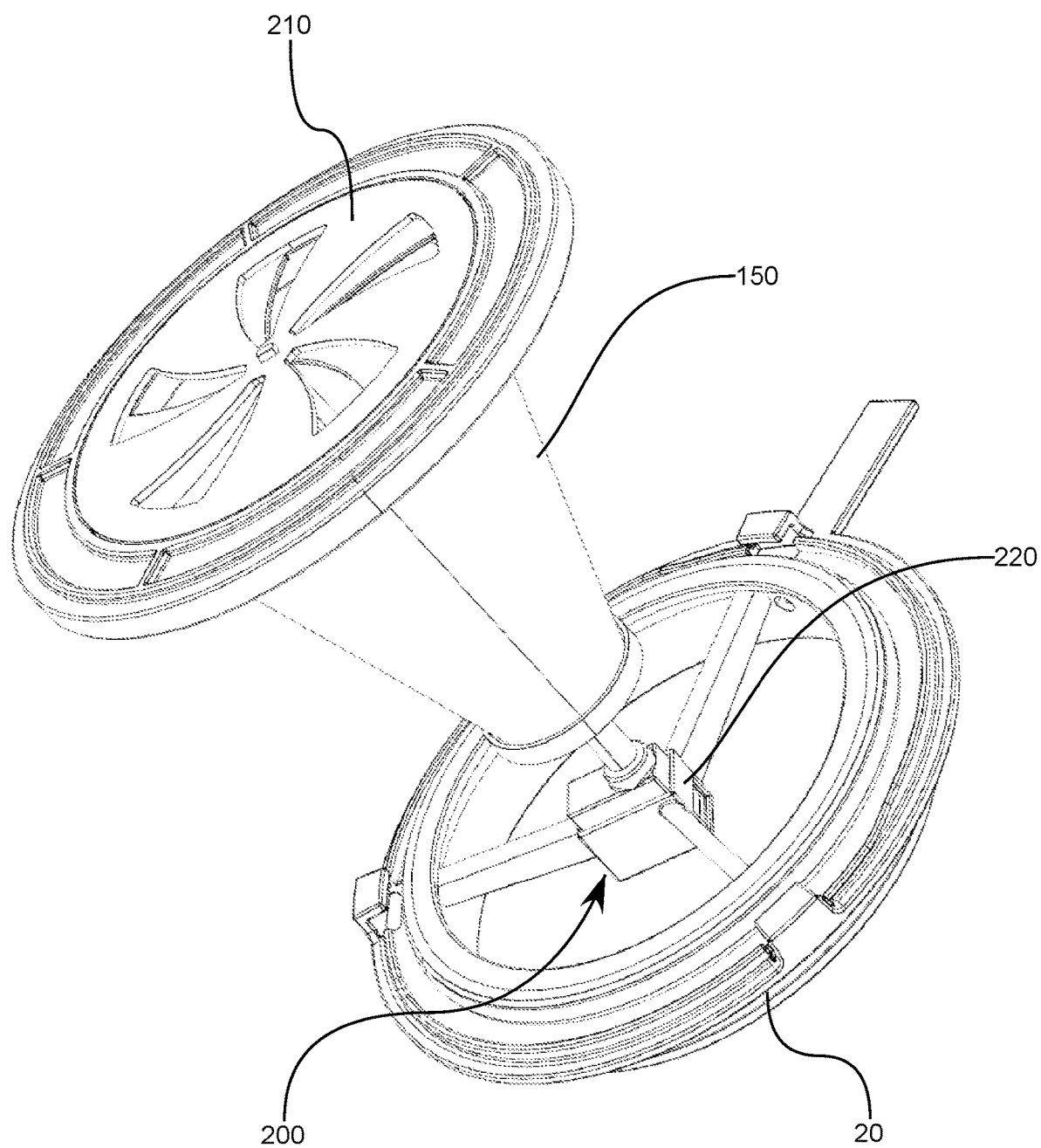
FIG. 5 illustrates a side perspective view of the multi-modal multi-media air filtration system of FIG. 1 having a first filter media hidden from view so as to illustrate a second or interior filter media.
Figure 6:
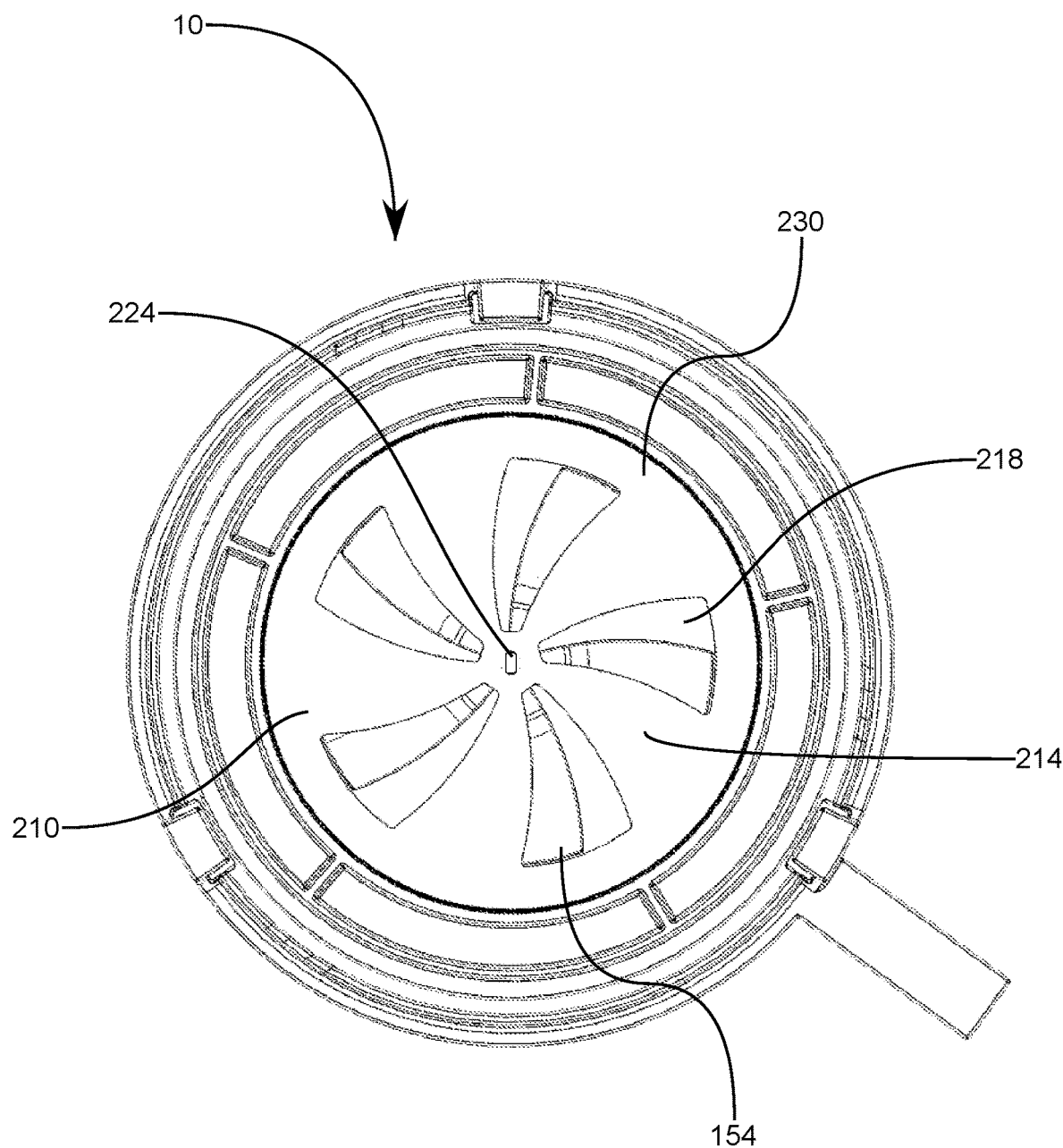
FIG. 6 illustrates a top view of the multi-modal multi-media air filtration system of FIG. 1.
Figure 7:
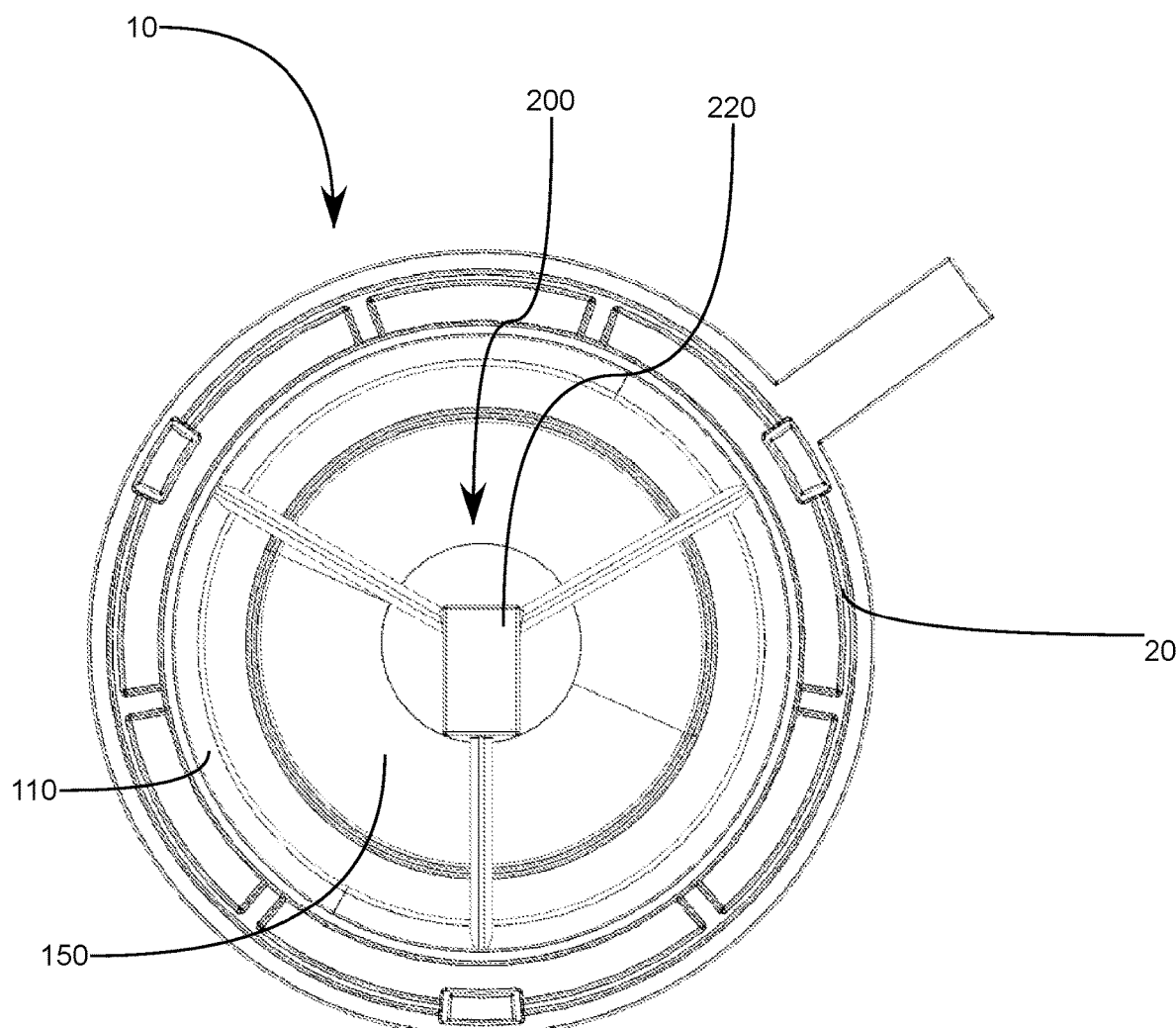
FIG. 7 illustrates a bottom view of the multi-modal multi-media air filtration system of FIG. 1.

As illustrated particularly in FIG. 4, the filter media assembly 100 can also be provided with a plurality of filter media, wherein a first filter media 110 extends across a first air flow path 112, the first air flow path extending through a first sidewall portion of the filter media assembly, such as through a radial sidewall 104. The second filter media 150 can then be configured to extend across a second air flow path 152, the second air flow path 152 extending across a second sidewall portion of the filter media assembly, such as through the axial end 106 of the filter media assembly 100.

The multi-modal multi-media air filtration system 10 can then include an actuation assembly 200 which can be configured to selectively open or close one of the first air flow path 112 or the second air flow path 152.

In some embodiments, the filter media assembly 100 can further include solid sealing portions 156 having one or more flow path apertures 154 provided about the second end 106 wherein the apertures form a portion of the second flow path 152. The actuation assembly 200 can then be provided with a movable blocking mechanism 210 which can be provided with fins 214 or some other solid component and corresponding apertures 218 which can then be configured to selectively open or close the one or more flow path apertures 154 based on a relative position.

In some alternative embodiments, not shown, the blocking mechanism 210 could alternatively be provided as an openable grate, flap, or some other structure which can be configured to selectively block or open the second air flow path. Or alternatively, a secondary blocking mechanism can also be built into a housing portion surrounding the first air flow path through the first filter media so as to exclusively switch back and forth between air flow paths.

As illustrated in FIGS. 1-10 the blocking mechanism 210 can be provided as a rotatable disc 230 provided with one or more corresponding apertures 218 wherein rotation of the rotatable disc selectively opens or closes second flow path apertures 154.

Figure 8A:
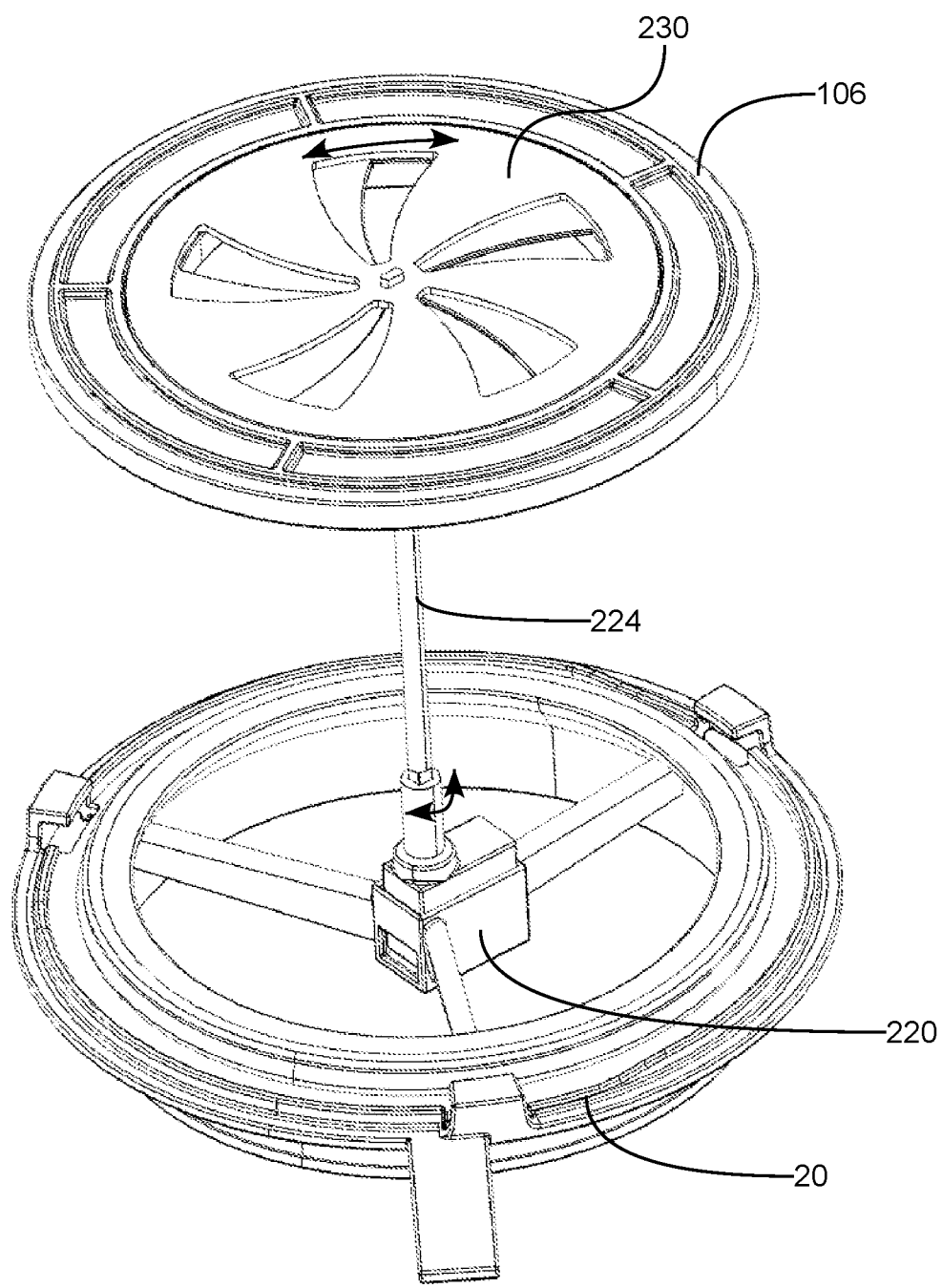
FIGS. 8A-B illustrate top and bottom perspective views of the multi-modal multi-media air filtration system of FIG. 1 having all filter media hidden from view.
Figure 8B:
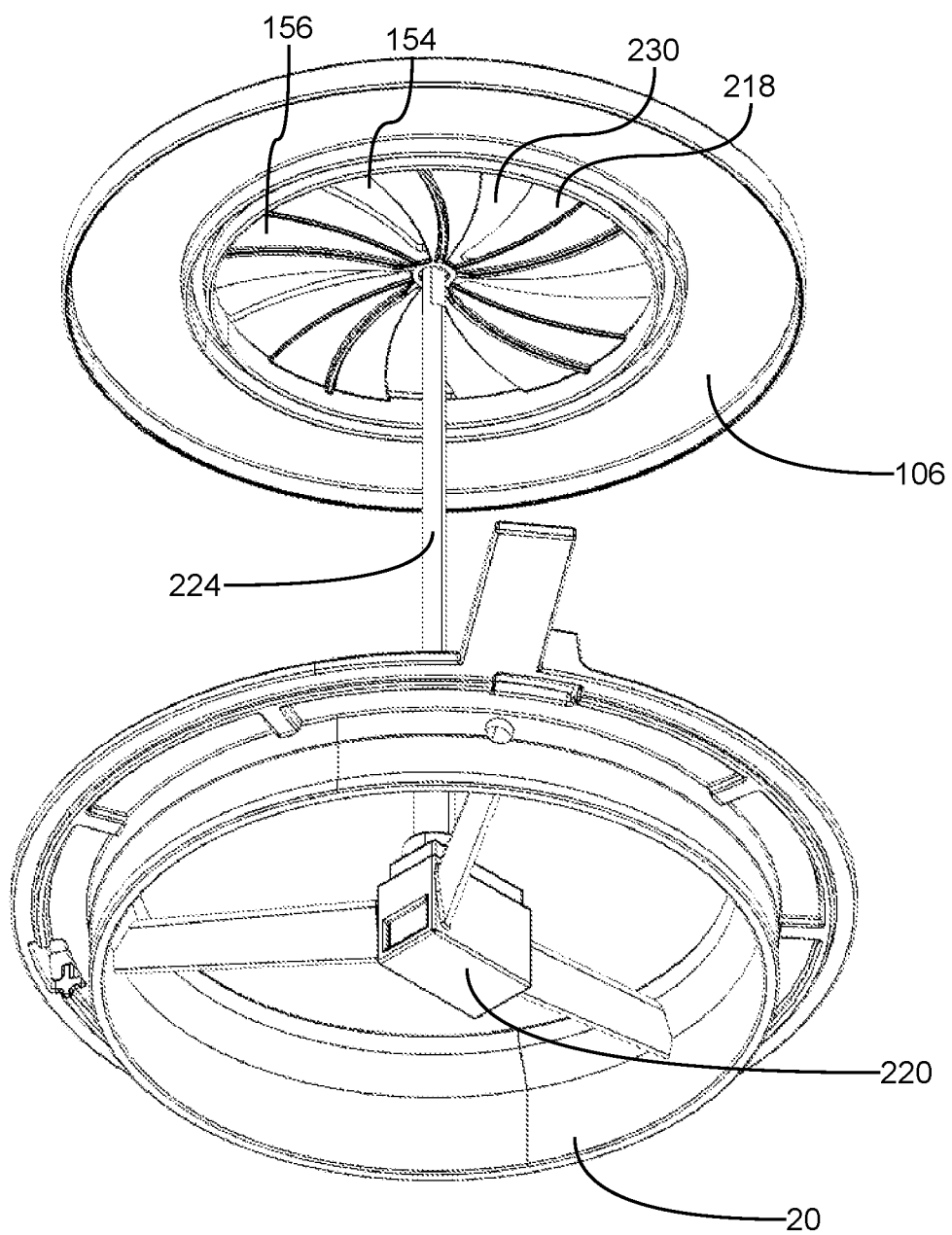
Figure 9:
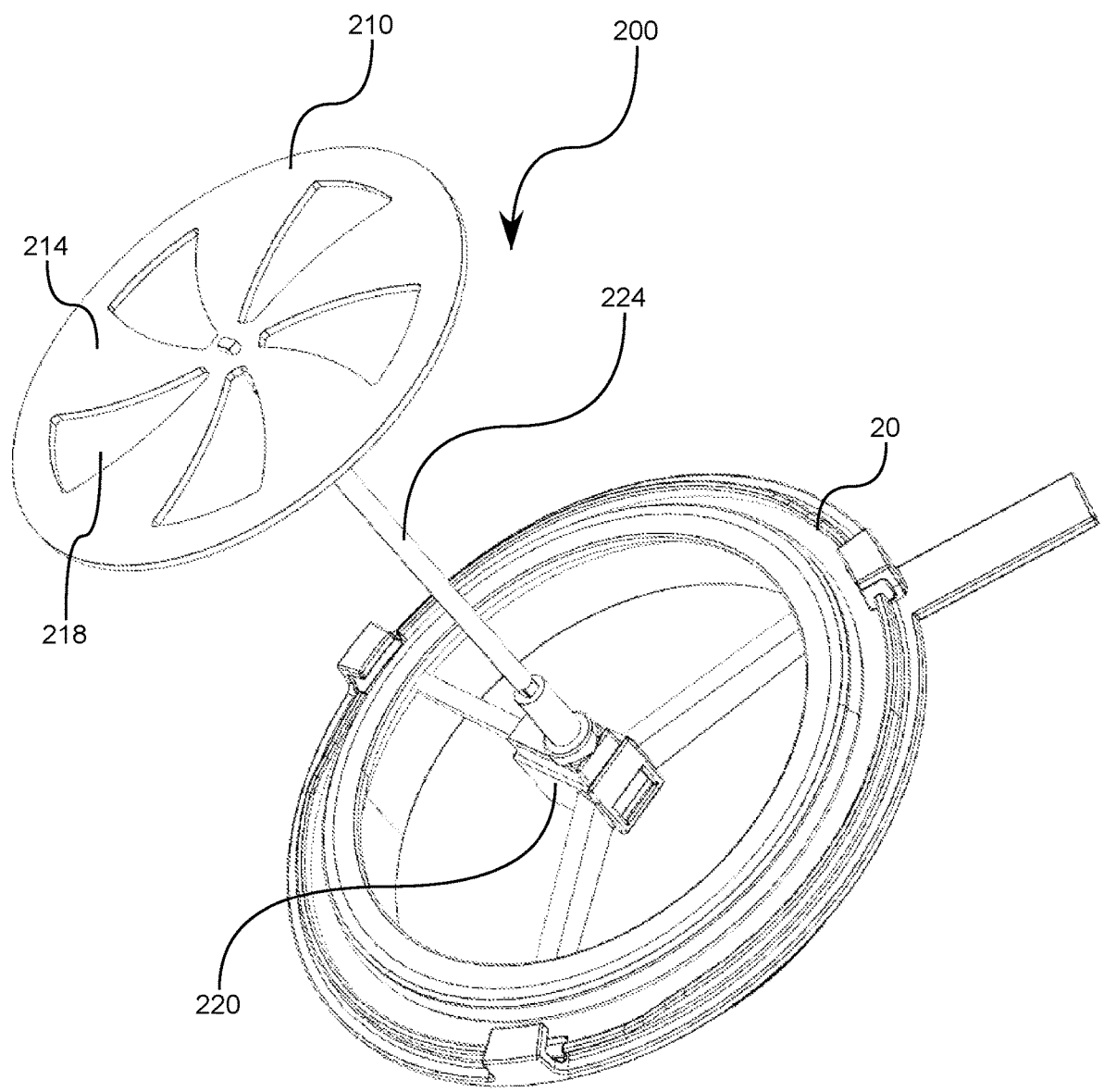
FIG. 9 illustrates an isometric view of a base and rotational actuation assembly for use in altering air flow paths through the multi-modal multi-media air filtration system of FIG. 1.
Figure 10A:
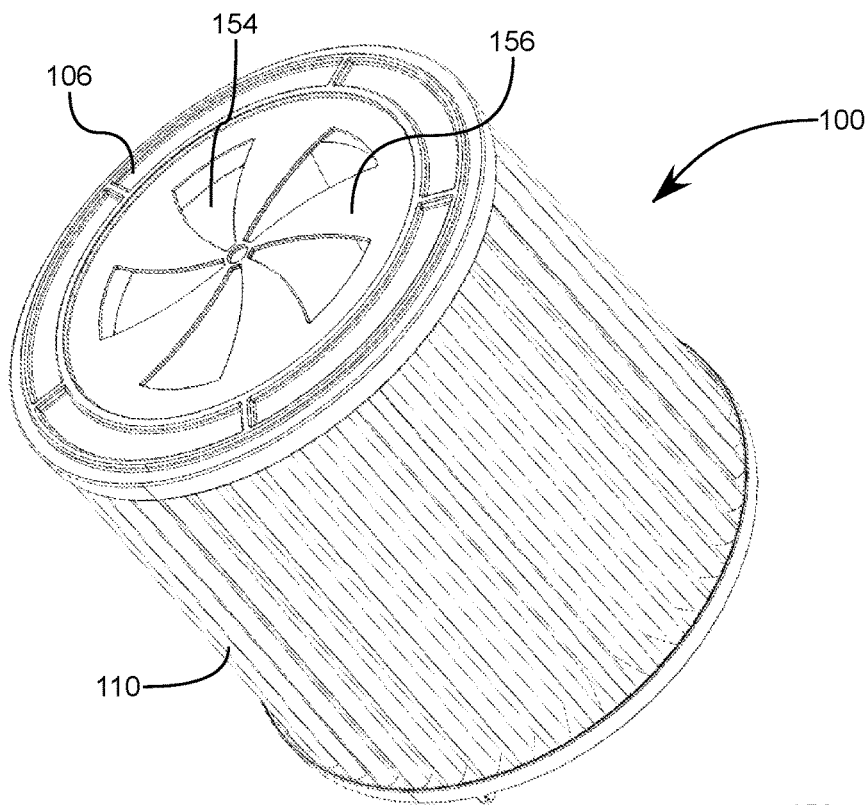
FIGS. 10A-B illustrate isometric and perspective cross-sectional views of a filter media assembly for use in the multi-modal multi-media air filtration system of FIG. 1.
Figure 10B:
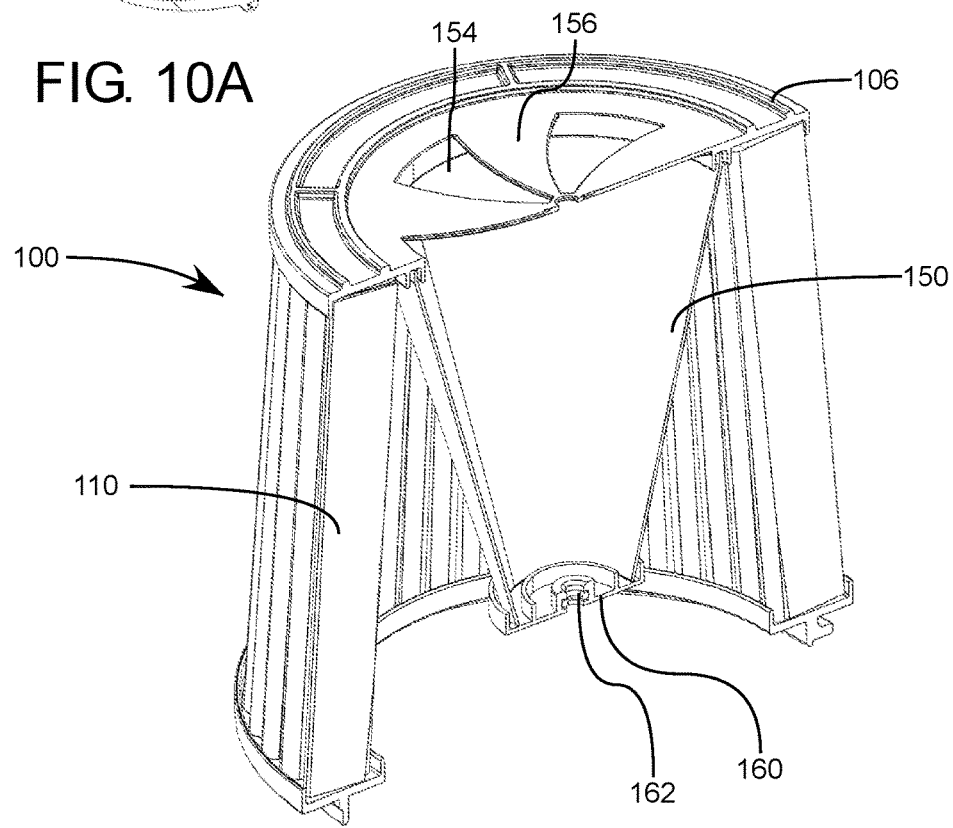

In this embodiment the movable blocking mechanism 210 can be actuated through rotation, as particularly illustrated in FIG. 8A, wherein an actuator 220 rotates a rod 224 connected to the rotatable disc 230 so as to selectively open or close the flow path apertures.

The rod 224 can have a keyed end which allows for interfacing with the actuator 220 but allows axial translation during removal. In such an embodiment, the blocking mechanism, i.e. the rotatable disc can be removed and replaced with the filter media assembly.

Alternatively, the rod 224 can be securely affixed axially to the actuator 220 and blocking mechanism or rotatable disc can be selectively removed from the rod 224 during service operations.

It will be further appreciated, that the second filter media 150 can be provided with a lower sealing portion 160 which can also be provided with a shaft seal 162 for sealing against the shaft 224. In this manner the shaft 224 can extend though a bottom portion of the second filter media 150 and thus prevent the flow of unfiltered air through the second filter media. Similarly, the filter media assembly 100 can be provided with a seal 142 which can aid in sealing the filter media assembly 100 to the base 20 and thus prevent unfiltered air from traveling through this mating point.

In the embodiments shown the actuator is illustrated as an electrical motor which is electrically operated so as to provide rotation, however, rotation could be achieved through mechanical manipulation such as springs or pull cables which can be utilized by a user from, for example, within the cockpit or driver's seat of the equipment or vehicle in order to provide the requisite rotation so as to move between the first and second mode of operation.

It will also be understood that the blocking mechanism 210 can be provided about an exterior end surface of the second end 106 of the second filter media 100 such that when in the closed position the pressure gradient actually helps pull the blocking mechanism 210 against the apertures so as to form a more secure seal.

In some alternative embodiments, such as the embodiment shown in FIGS. 11A-B an alternative filter media assembly 100A can be provided with a lower sealing portion 160A can function as a blocking mechanism 210A where this lower sealing portion 160A can instead be configured to translate axially on shaft 224A which is pushed or pulled by actuator 220A so as to open or close the second flow path 152A. This embodiment can include an open or first state as illustrated in FIG. 11A in which both the first and second flow paths are open. Alternatively, this embodiment can also be operated in a second sealed or second state in which the blocking mechanism seals against a distal end of the filter media assembly so as to block the second flow path 152A and thus only utilize the first flow path 112A.

In this embodiment, the second filter media 150A can be provided as a flexible filter media, but could also be provided instead as a pleated, corrugated, or accordion style filter media provided having numerous concentric rings which can then collapse or expand as needed depending on the mode of operation.

Figure 12A:
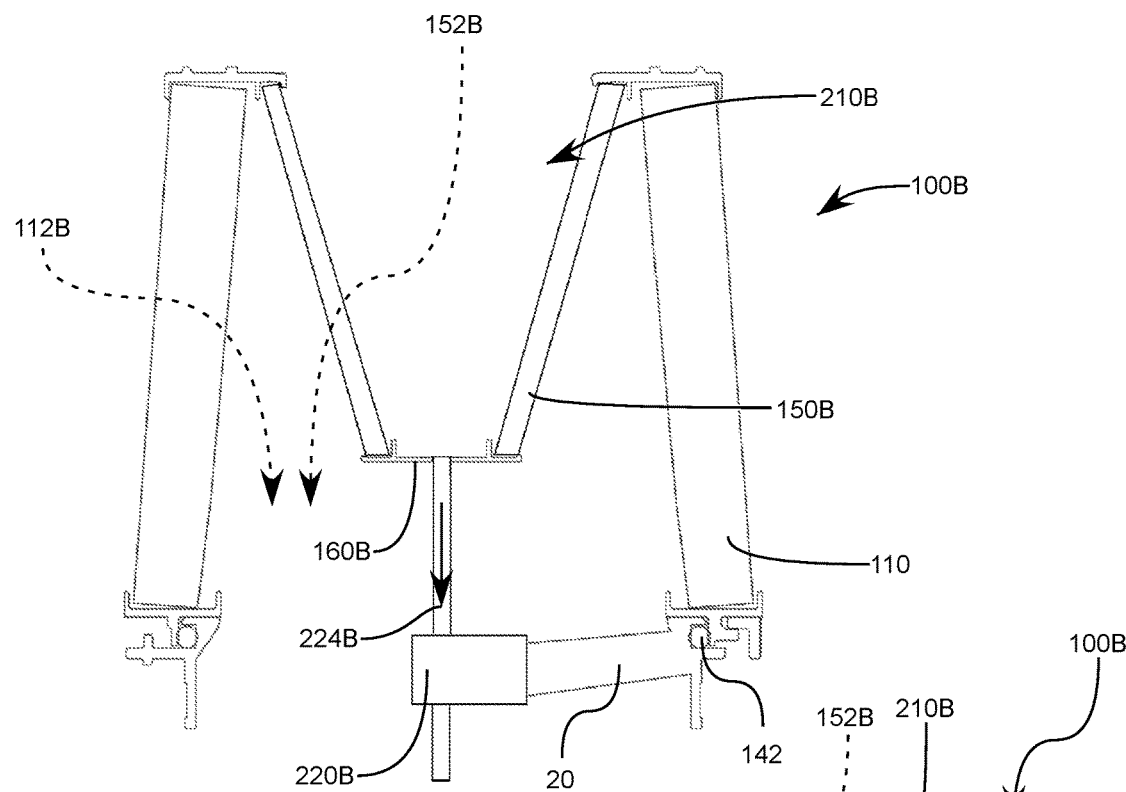
FIGS. 12A-B illustrate side views of an alternative embodiment of a multi-modal multi-media air filtration system utilizing yet another alternative actuation assembly.
Figure 12B:
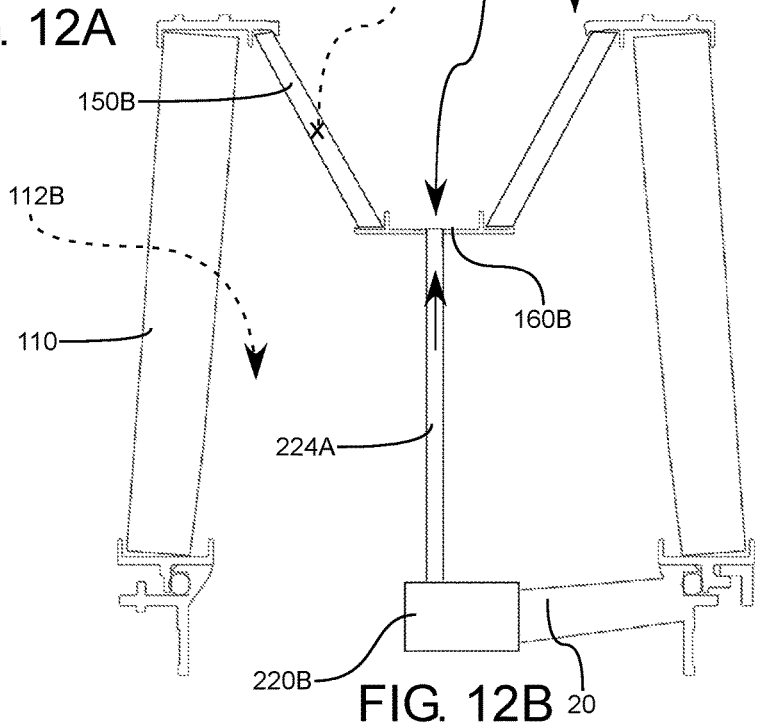

In some alternative embodiments, such as the embodiment shown in FIGS. 12A-B an alternative filter media assembly 100B can be provided with an expandable and collapsible filter media 150B about the second flow path 152B. This filter media 150B can be provided with a plurality of collapsible apertures therethrough which are open in an expanded state, as illustrated in FIG. 12A, but collapsed and thus closed in a compressed or collapsed state, as illustrated in FIG. 12B. In this embodiment, the lower push platform 160B can then function to translate axially on shaft 224A which is pushed or pulled by actuator 220A so as to open or close the second flow path 152B by expanding or collapsing the filter media 150B. This embodiment can include an open or first state as illustrated in FIG. 12A in which both the first flow path 112B and second flow path 152B are open. Alternatively, this embodiment can also be operated in a second sealed or second state, as illustrated in FIG. 12B, in which the push platform 160B can cause the apertures therethrough to collapse and thus seal the filter media 150B so as to block the second flow path 152B and thus only utilize the first flow path 112B.

In some embodiments, and as shown herein, the first filter media 110 can define an internal cavity 114, wherein the second filter media 150 can be provided within the internal cavity 114 so as to decrease the overall profile size.

In yet additional embodiments, the second filter media 150 can be provided having a generally conical shape rather than cylindrical so as to increase effective surface area of the filter media.

In various embodiments, the multi-modal multi-media air filtration system 10 can be operable in a first mode defined by a state wherein air is received from an ambient area and into an interior portion of the filter media assembly through only the first filter media 110 utilizing only the first air flow path 112. Alternatively, the multi-modal multi-media air filtration system 10 can then be operable in a second mode wherein air is received through both the first filter media 110 and through the second filter 150 media utilizing both air flow path 152A and 112A. In some alternative embodiments, the first filter media 110 can be provided with an alternative blocking mechanism, not shown, which can then be utilized to operate the multi-modal multi-media air filtration system 10 in a third mode defined by receiving air only through the second filter 150 media utilizing only air flow path 152.

In some embodiments the second filter media 150 can have a lower air flow resistance than the first filter media 110. In which case, operating in the second mode will draw a majority of air through the second air flow path 152 due to the increased resistance through the first air flow path. In this manner higher air-flow can be achieved in the second mode and thus increase performance, albeit, provide less particulate removal.

Alternatively, the first filter media can have a lower air flow resistance than the second filter media, however, in this situation it would be preferable to also provide a selective blocking mechanism around an exterior surface of the first filter media such that air can be forced through the second air flow path when desired.

Also contemplated herein are various methods of providing air filtration utilizing one or more of the devices discussed above, wherein the method can include the steps of: providing a base having one or more connection features; affixing a filter media assembly to the base; the filter media assembly including: a first filter media extending across a first air flow path, the first air flow path extending through a radial sidewall of the filter media assembly; and a second filter media extending across a second air flow path, the second air flow path extending through a second end of the filter media assembly; providing an actuation assembly about the base, the actuation assembly being configured to selectively open or close one of the first air flow path or the second air flow path by moving a movable blocking mechanism thus selectively opening or closing the first flow path or the second flow path; and opening and closing the first air flow path or the second air flow path.

This method can also include various alternative steps, which can include: receiving air from an ambient area into an interior portion of the filter media assembly through only the first filter media thus defining a first mode; and alternating to a second mode, the second mode being defined by receiving air through both the first filter media and through the second filter media.

Figure 13:
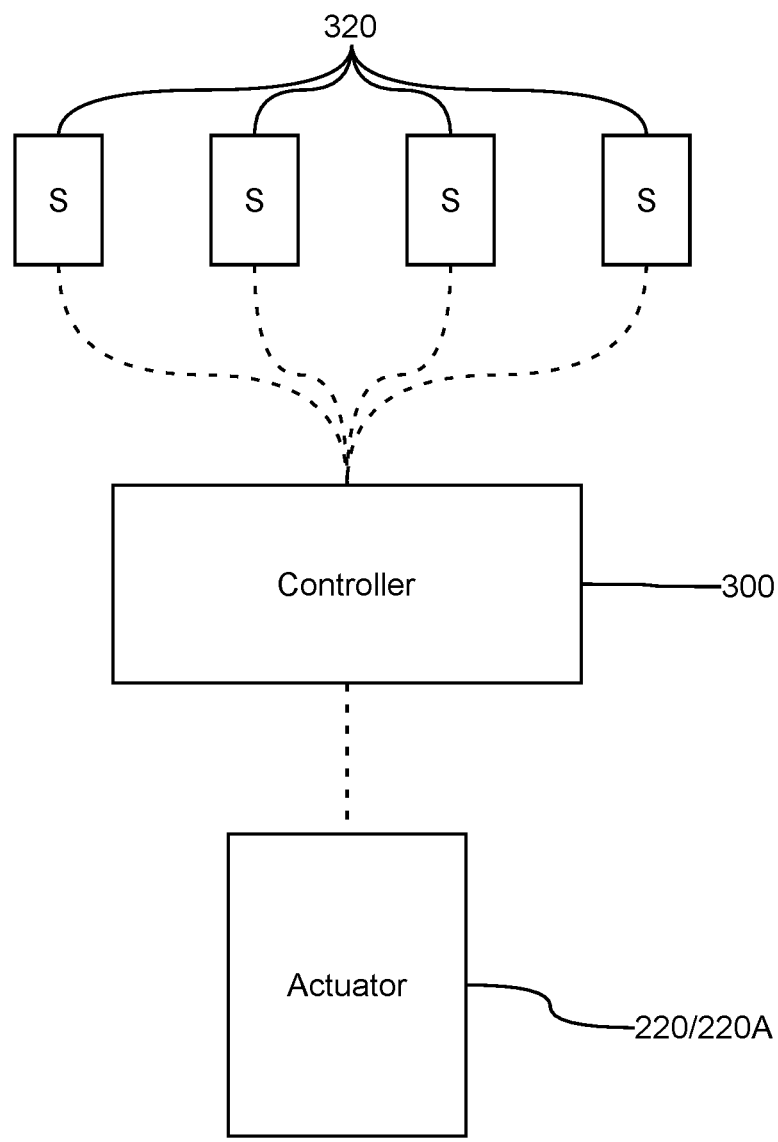
FIG. 13 illustrates an exemplary schematic of various controls and sensors configured for use with the various multi-modal multi-media air filtration systems contemplated herein.
Figure 14A:
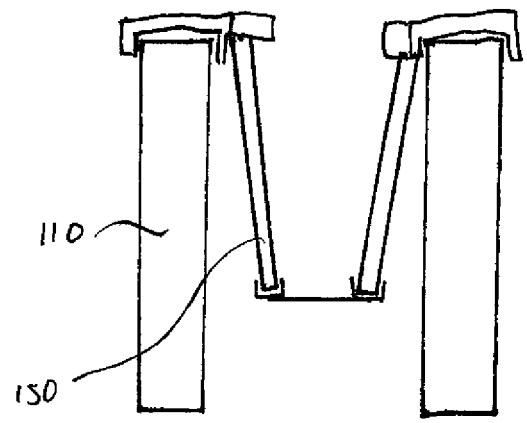
FIG. 14A illustrates a perspective cross-sectional view of a filter media assembly, similar to FIG. 10B, differing in that the first flow media is cylindrical and the second flow media lacks the shaft seal and the solid sealing portions.
Figure 14B:
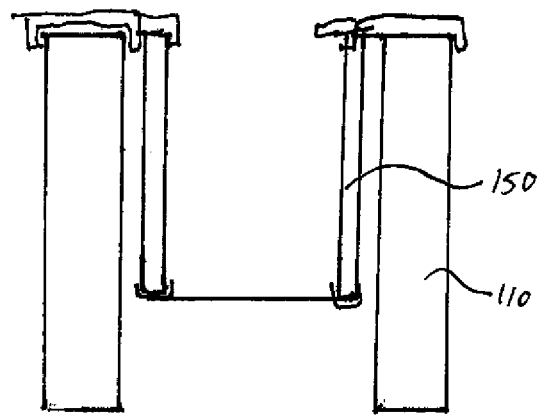
FIG. 14B illustrates a perspective cross-sectional view of a filter media assembly, similar to FIG. 14A, differing in that both the first flow media and second flow media are cylindrical.
Figure 14C:
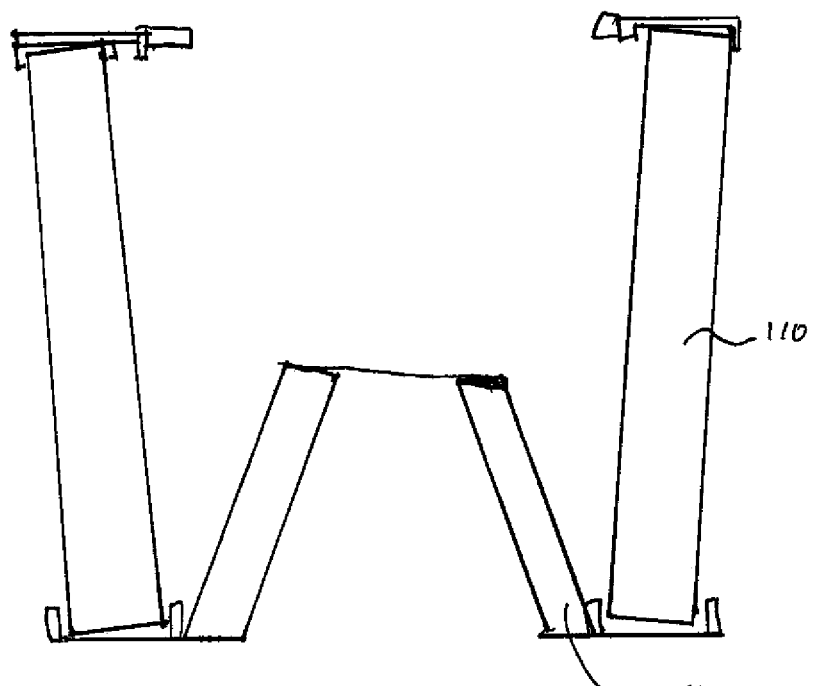
FIG. 14C illustrates a perspective cross-sectional view of a filter media assembly, similar to FIG. 10B, differing in that the second flow media lacks the shaft seal and the solid sealing portions.

Additionally, the method can include a step of receiving a user input to alternate between the first operation mode and the second operation mode or receiving an automatically generated command to alternate between the first operation mode and the second operation mode, the automatically generated command being based on one or more sensed parameters. As such, and as illustrated in FIG. 13, a controller 300 can be provided which is operatively connected to one or more sensors 320, the sensors being capable of detecting a particulate count in the air, or any number of other environmental parameters. The controller then being configured to determine an optimal degree of filtration and select a mode corresponding thereto and issue a command to the actuator to switch into the corresponding operation mode.

It will be understood that various pressure sensors can be utilized to determine a pressure differential across the filter media across the various filter media and flow paths and transmit corresponding pressure information to the controller 300. In this manner the system can automatically adjust air flow or switch between modes based on detected performance needs of the corresponding system. For purposes of example, a car being driven hard will often experience a larger air draw through the filter media assembly which would correspond to a given pressure differential change. In response to this increased pressure differential the system can throttle or open the second flow path through the second filter media to allow a desired volume of air or a given pressure differential through or across the various air flow paths through the filter media assembly.

While the principles of the invention have been described herein, it is to be understood by those skilled in the art that this description is made only by way of example and not as a limitation as to the scope of the invention. Other embodiments which are not discussed herein but which constitute obvious variants are therefore contemplated herein and as such fall within the scope of the present invention in addition to the exemplary embodiments shown and described herein. It will be further appreciated that while the various embodiments have been discussed separately herein, that each of the embodiments can be modified so as to incorporate features or options of any of the alternative embodiments without departing from the inventive concept contained herein. Modifications and substitutions by one of ordinary skill in the art are thus considered to be within the scope of the present invention.

We claim:

1. A multi-modal multi-media air filtration system, the system comprising:
   a base having one or more connection features;
   a filter media assembly, the filter media assembly being configured to attach to the base portion at a first end, the filter media assembly further comprising:
      a first filter media extending across a first air flow path, the first air flow path extending through a first sidewall portion of the filter media assembly;
      a second filter media extending across a second air flow path, the second air flow path extending through a second sidewall portion of the filter media assembly; and
      an actuation assembly configured to selectively open or close one of the first air flow path or the second air flow path by moving a movable blocking mechanism.

2. The multi-modal multi-media air filtration system of claim 1, wherein the filter media assembly further comprises one or more flow path apertures provided about a second end.

3. The multi-modal multi-media air filtration system of claim 2, wherein the actuation assembly further comprises a movable blocking mechanism being configured to selectively open or close the one or more flow path apertures.

4. The multi-modal multi-media air filtration system of claim 3, wherein the blocking mechanism is provided as a rotatable disc provided with one or more corresponding apertures wherein rotation of the rotatable disc selectively opens or closes the one or more flow path apertures.

5. The multi-modal multi-media air filtration system of claim 3, wherein the blocking mechanism is configured to translate axially so as to open or close the one or more flow path apertures.

6. The multi-modal multi-media air filtration system of claim 1, wherein the first filter media defines an internal cavity, and wherein the second filter media is provided within the internal cavity.

7. The multi-modal multi-media air filtration system of claim 1, wherein the second filter media is provided having a generally conical shape.

8. The multi-modal multi-media air filtration system of claim 1, wherein the multimodal multi-media air filtration system is operable in a first mode defined by a state wherein air is received from an ambient area and into an interior portion of the filter media assembly through only the first filter media, and wherein the multi-modal multi-media air filtration system is operable in a second mode wherein air is received through both the first filter media and through the second filter media.

9. The multi-modal multi-media air filtration system of claim 8, wherein the second filter media has a lower air flow resistance than the first filter media.

10. The multi-modal multi-media air filtration system of claim 3, wherein the movable blocking mechanism is provided about an exterior end surface of the second end of the second filter media.

11. The multi-modal multi-media air filtration system of claim 1, wherein the second filter media has a lower air flow resistance than the first filter media.

12. A multi-modal multi-media air filtration system, the system comprising:
   a filter media assembly, the filter media assembly further comprising:
      a first filter media extending across a first air flow path, the first air flow path extending through a radial sidewall of the filter media assembly;
      a second filter media extending across a second air flow path, the second air flow path extending through a second end of the filter media assembly, wherein the first filter media defines an internal cavity, and wherein the second filter media is provided within the internal cavity;
   an actuation assembly configured to selectively open or close one of the first air flow path or the second air flow path;
   a rotatable disc provided with one or more corresponding apertures wherein rotation of the rotatable disc selectively opens or closes the one or more flow path apertures, the rotatable disc being provided about an exterior end surface of the second end of the second filter media;
   wherein the filter media assembly further comprises one or more flow path apertures provided about the second end;
   wherein the multi-modal multi-media air filtration system is operable in a first mode defined by a state wherein air is received from an ambient area and into an interior portion of the filter media assembly through only the first filter media, and wherein the multimodal multi-media air filtration system is operable in a second mode wherein air is received through both the first filter media and through the second filter media; and
   wherein the second filter media has a lower air flow resistance than the first filter media.

* * * * *